United States Patent [19]
Aoki

[11] Patent Number: 5,165,839
[45] Date of Patent: Nov. 24, 1992

[54] WHEELCHAIR LIFT FOR RAILWAY CARS

[75] Inventor: Lawrence S. Aoki, Modesto, Calif.

[73] Assignee: Hogan Mfg., Escalon, Calif.

[21] Appl. No.: 602,949

[22] Filed: Oct. 24, 1990

[51] Int. Cl.$^5$ ............................................. B60P 1/44
[52] U.S. Cl. .................................. 414/541; 414/545; 414/921
[58] Field of Search ............... 414/539, 540, 558, 921, 414/541, 545; 105/450

[56] References Cited

U.S. PATENT DOCUMENTS

| | | | |
|---|---|---|---|
| 3,651,965 | 3/1972 | Simonelli et al. | 414/540 |
| 4,007,844 | 2/1977 | Perkins | 414/541 X |
| 4,273,498 | 6/1981 | Dickhart, III et al. | 414/556 |
| 4,275,664 | 6/1981 | Reddy | 105/450 X |
| 4,285,416 | 8/1981 | Dudynskyj | 187/9 R |
| 4,347,030 | 8/1982 | Kingston | 414/556 |
| 4,420,286 | 12/1983 | Hanson et al. | 414/921 X |
| 4,466,771 | 8/1984 | Thorley et al. | 414/787 |
| 4,583,466 | 4/1986 | Reddy et al. | 414/921 X |
| 4,606,433 | 8/1986 | Smalley et al. | 187/9 R |
| 4,804,308 | 2/1989 | Hamblin et al. | 414/540 |
| 4,907,936 | 3/1990 | Bourdage | 414/921 X |
| 5,026,244 | 6/1991 | Dorn | 414/921 X |

FOREIGN PATENT DOCUMENTS

| | | | |
|---|---|---|---|
| 2138772 | 10/1984 | United Kingdom | 414/558 |
| 2190649 | 11/1987 | United Kingdom | 414/558 |

Primary Examiner—Michael S. Huppert
Assistant Examiner—James Keenan
Attorney, Agent, or Firm—Christensen, O'Connor, Johnson & Kindness

[57] ABSTRACT

A wheelchair lift designed for mounting in the stairwell of a railway car. The lift includes a vertical translation member which is attachable to one wall of the stairwell, and a platform assembly attached to the translation mechanism so as to be movable between an upper position, where the platform assembly is substantially coplanar with the floor of the railway car, and a lower position, adjacent the railroad bed. The platform assembly includes a main platform attached to the translation mechanism, and a pivot platform, pivotally mounted to the outboard end of the main platform. In the stowed position, the pivot platform is positioned underneath the main platform. Retractable barriers are provided at the outboard end of the pivot platform and the inboard end of the main platform for preventing a wheelchair from rolling off the platforms.

7 Claims, 8 Drawing Sheets

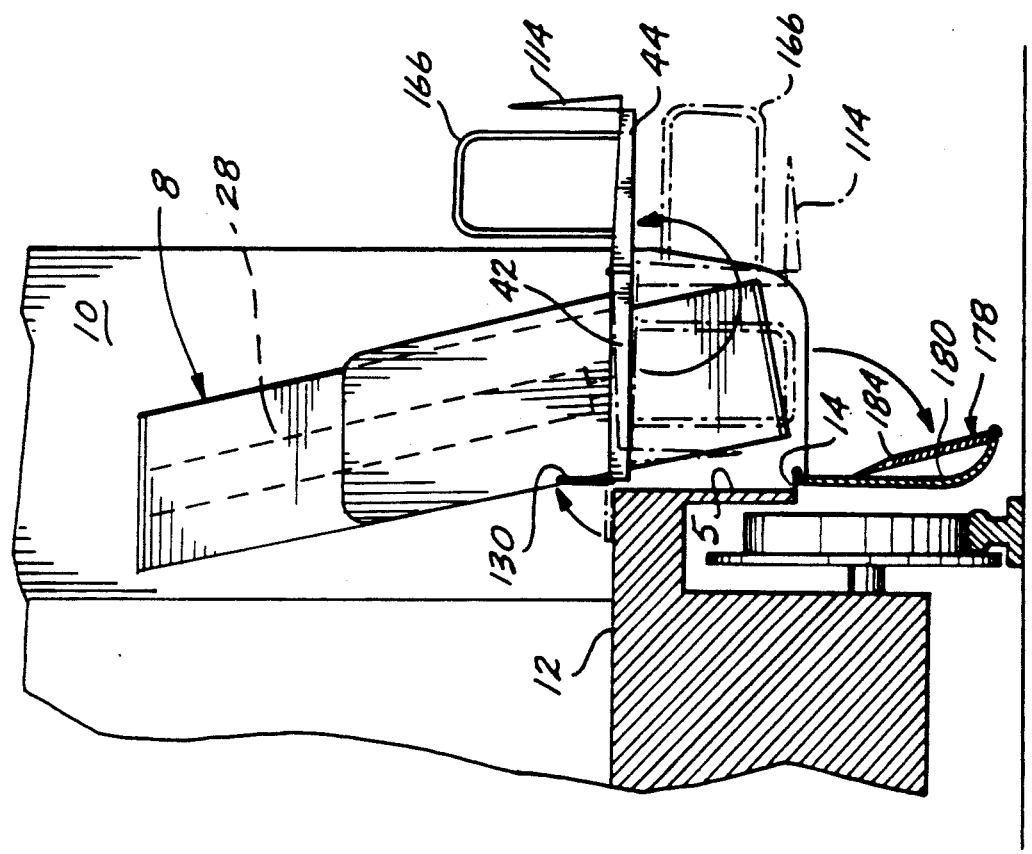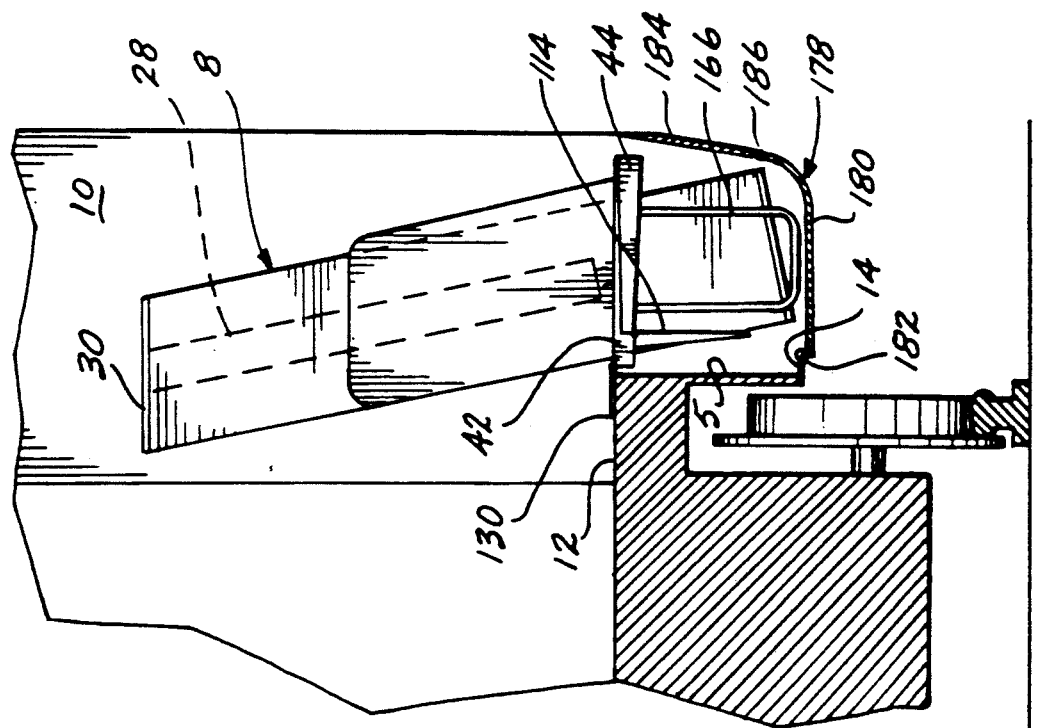

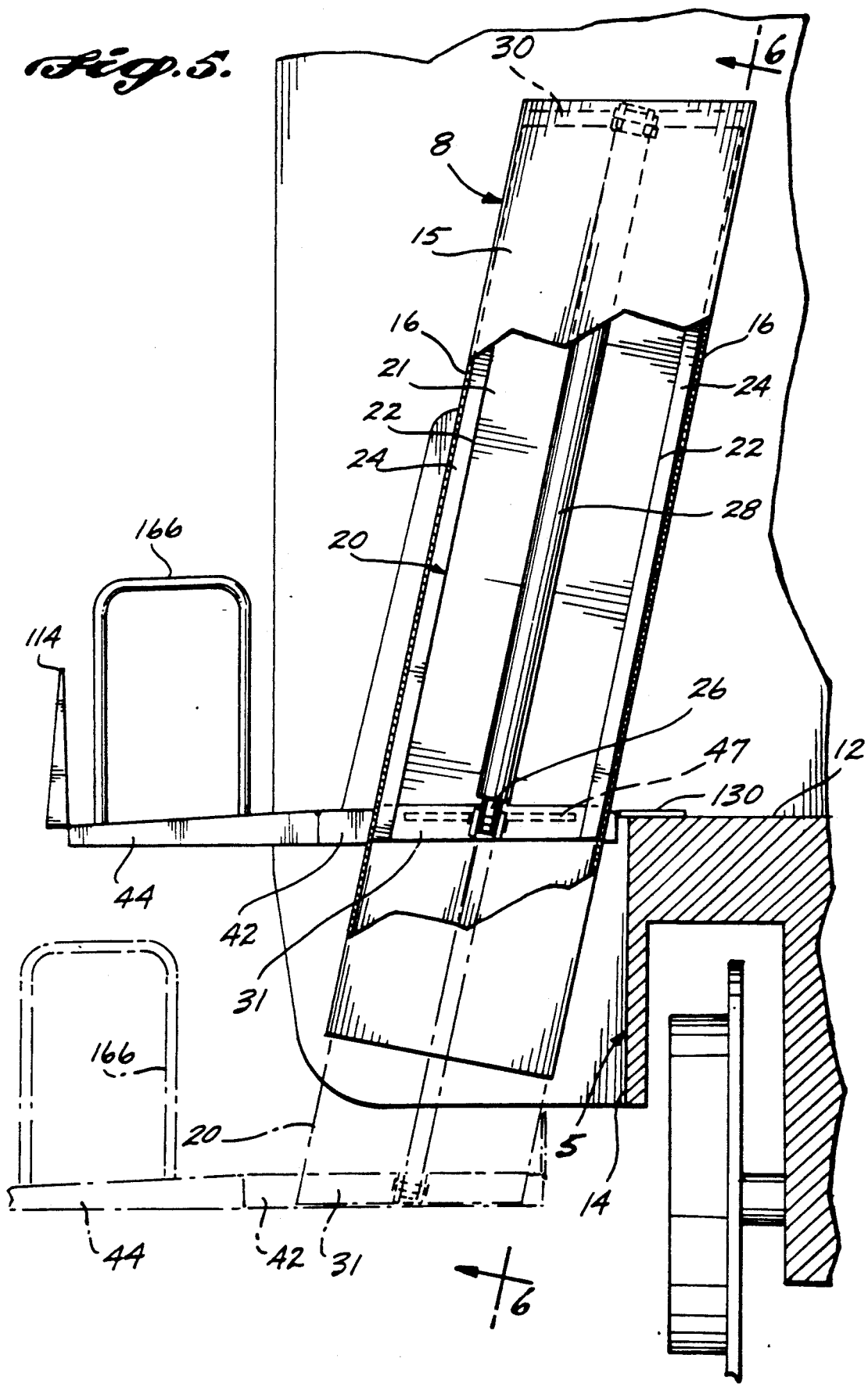

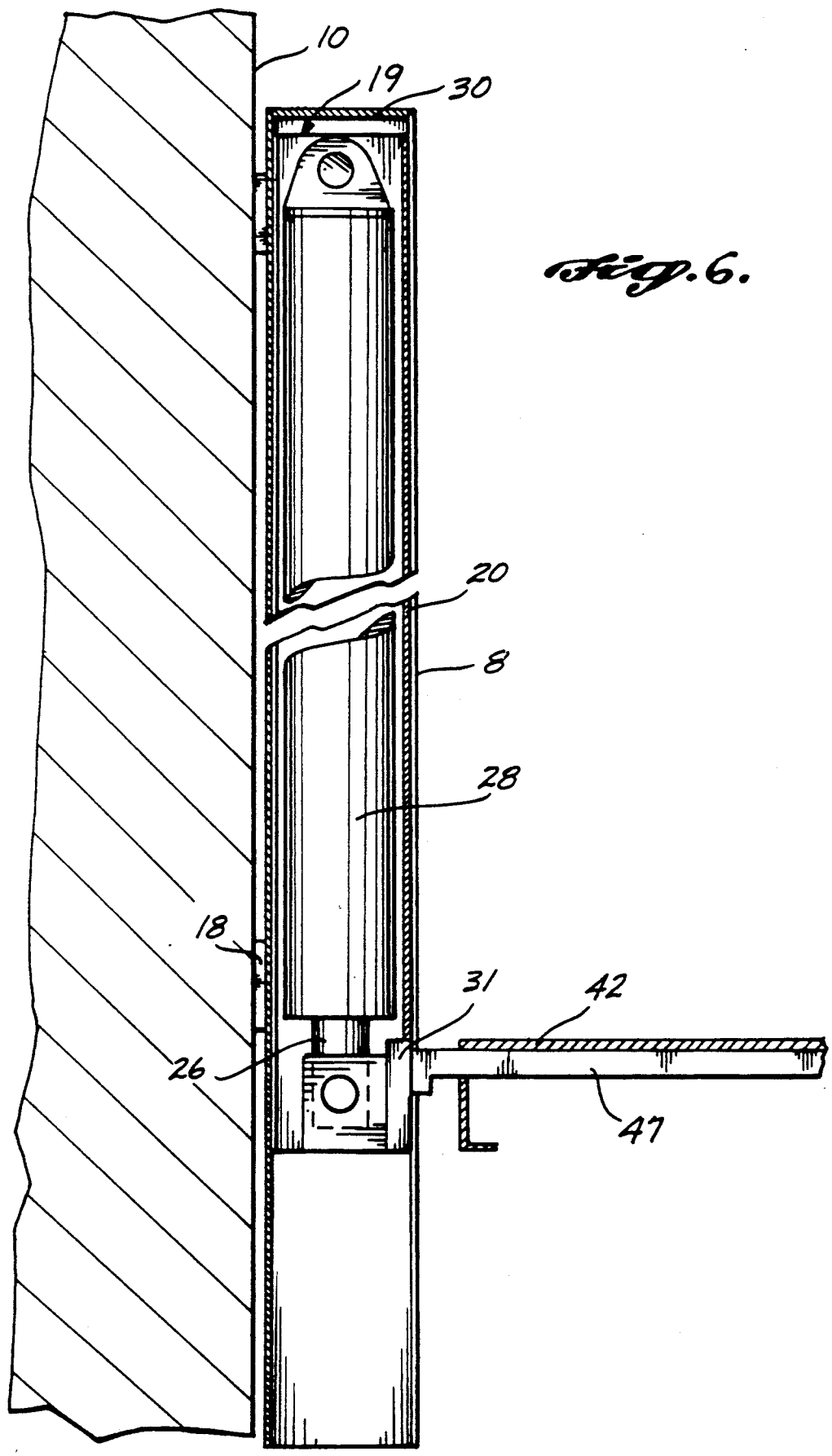

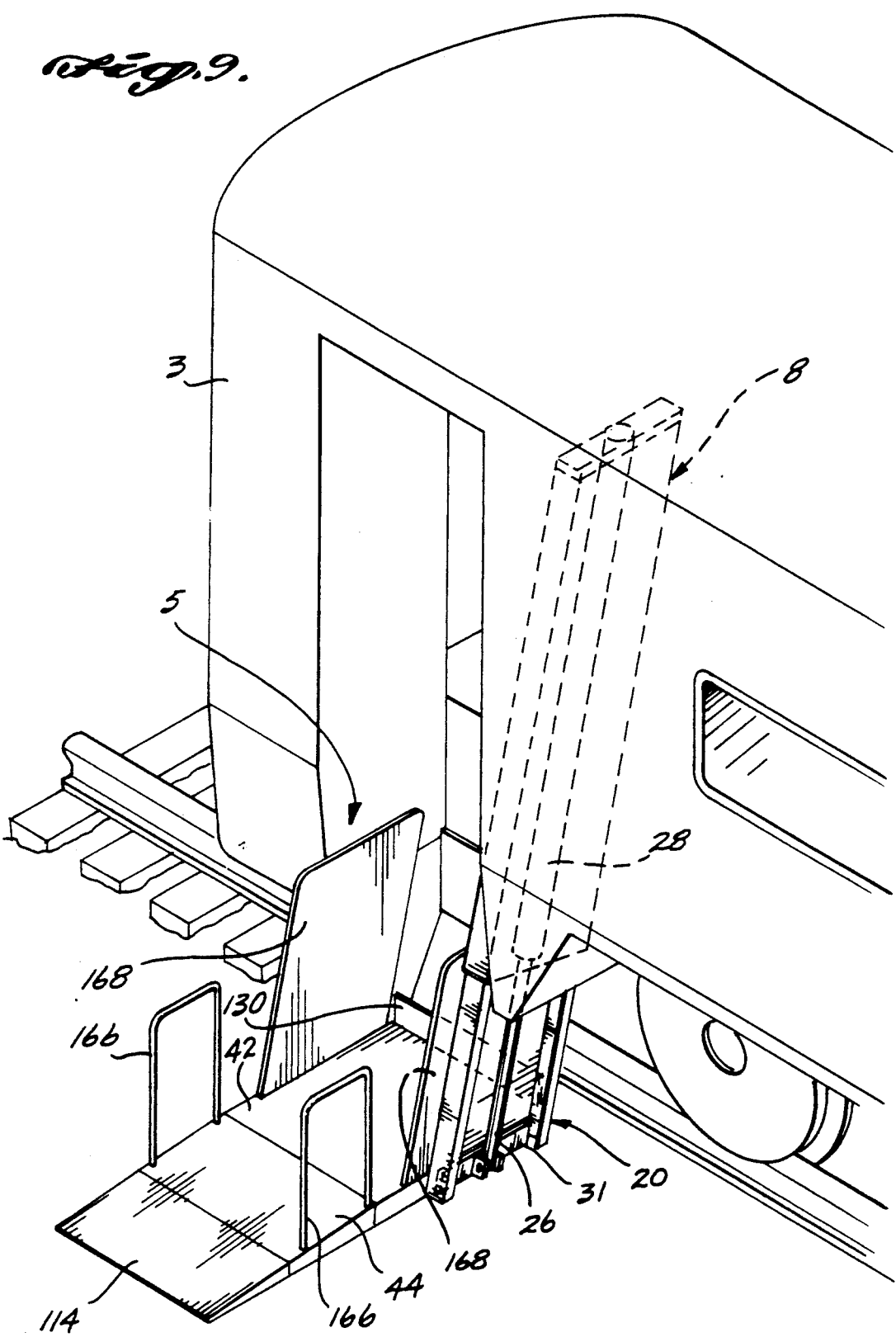

WHEELCHAIR LIFT FOR RAILWAY CARS

FIELD OF THE INVENTION

This invention relates generally to wheelchair lifts, and more particularly to wheelchair lifts which are designed to be mounted in the stairwell of railway cars.

BACKGROUND OF THE INVENTION

Wheelchair lifts have been proposed for many different kinds of vehicles, for instance, buses, vans and railroad passenger cars. However, the lifts in the prior art proposed for railroad cars typically utilize relatively complicated mechanical linkages, which tend to be relatively expensive and mechanically unreliable. In addition to their relative complexity, these prior art lifts require rather extensive protective means or shielding to ensure that a passenger is not subject to harm by exposed moving linkages. Further, the space required to store the linkages and to permit their movement during operation is substantial and may limit the size of the lift when such a device is to be mounted inside a standard railway car door opening.

Thus, a strong need exists for a wheelchair lift capable of raising and lowering wheelchairs into and out of vehicles such as railway cars without the use of relatively complicated and expensive linkages.

Additionally, a need exists for a novel wheelchair lift for vehicles, such as railway cars, that will fit in the relatively small amount of space available in a standard railway car stairwell, and at the same time will provide a relatively large amount of space to accommodate the wheelchair and its passenger.

Furthermore, the need exists for a novel wheelchair lift for railway cars and other vehicles that can be added to existing equipment without the need for substantial modification of the equipment.

BRIEF SUMMARY OF THE INVENTION

The invention in the illustrated embodiment comprises a guide tower to be attached to the bulkhead on one side of a railway car stairwell so as to extend at an angle to the vertical. A frame mounted in the tower carries a main platform. The frame includes means for moving the platform up or down as required. A pivot platform is provided on the main platform to increase the size of the wheelchair-supporting surface. Safety features are included on the platform.

BRIEF DESCRIPTION OF THE DRAWINGS

The invention itself is set forth in the claims appended hereto and forming a part of the specification, while an understanding of an embodiment thereof may be had by reference to the detailed description taken in conjunction with the following drawings in which:

FIG. 4 is a side elevation, cross-sectional view of the lift and a portion of the railway car in which it is mounted taken along line 4—4 in FIG. 2, with the platform assembly being shown in the stowed position;

FIG. 5 is a cross-sectional side elevation view of the lift and a portion of the railway car in which it is mounted taken along line 5—5 in FIG. 2, with the movable frame being shown in the upper position in solid view and in the lower position in phantom view;

FIG. 6 is a cross-sectional, side elevation view of the vertical translation mechanism taken along line 6—6 in FIG. 5;

FIG. 8 is similar to FIG. 4, except that the pivot platform has been raised to the extended position and the bridge barrier has been moved to the retracted position;

FIG. 9 is a perspective view of the lift and a portion of the railway car in which the lift is installed, with the platform assembly being shown in the lower, fully deployed position.

DETAILED DESCRIPTION OF THE INVENTION

Figure 1:
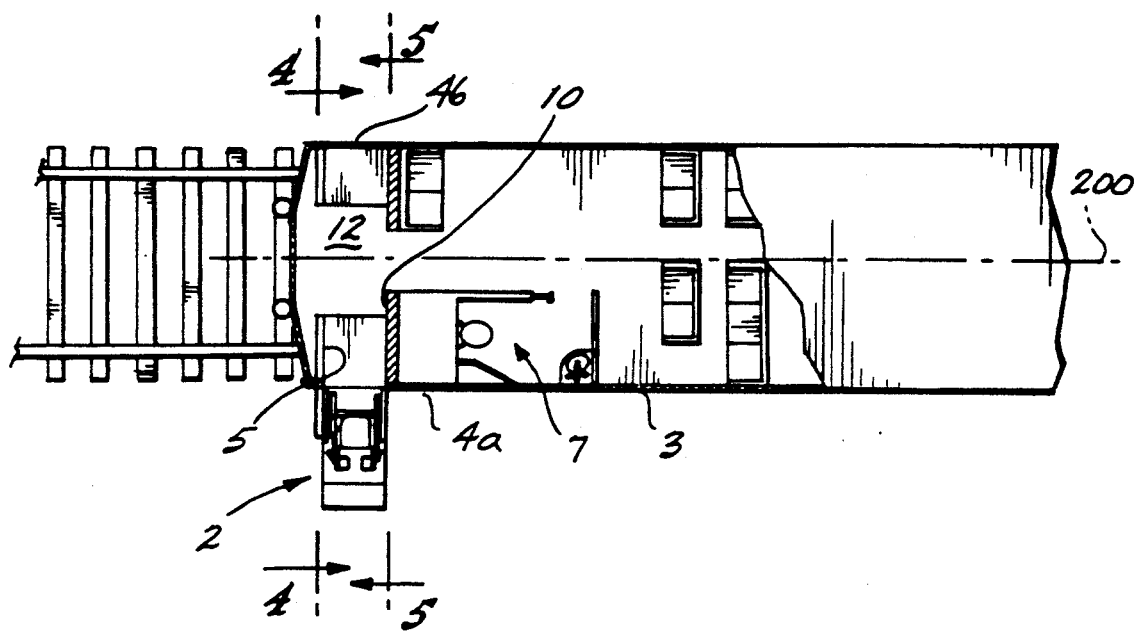
FIG. 1 is a plan view of a railway passenger car, partially broken away so as to illustrate one possible location for a lift in accordance with the invention.
Figure 2:
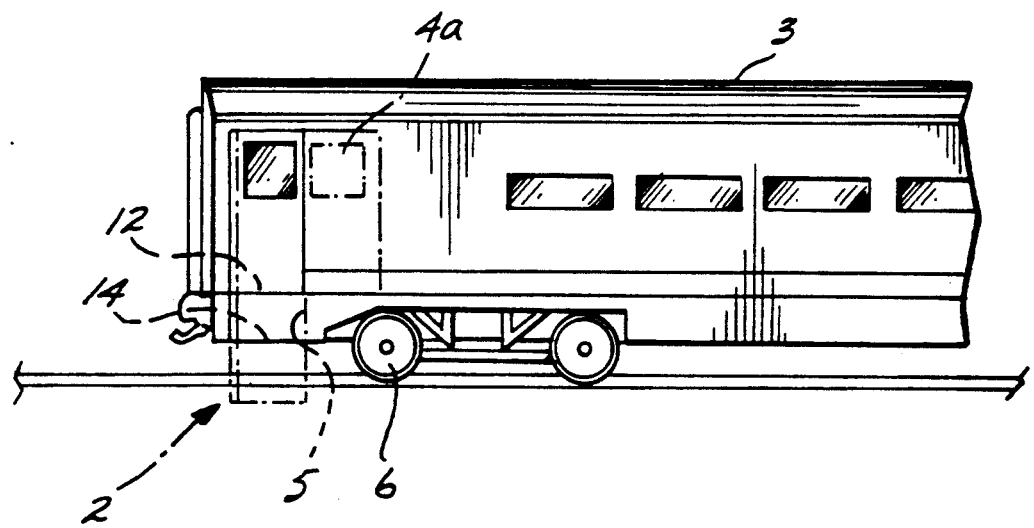
FIG. 2 is a side elevation view of the railway passenger car illustrated in FIG. 1, with the lift being shown in phantom view in the deployed position.

Referring to FIGS. 1 and 2, the present invention is a wheelchair lift 2 designed for use with a conventional passenger railway car 3. The latter includes a door 4a which opens and closes off a door opening positioned above a stairwell 5 which extends upwardly into the vestibule of the railway car. Door 4a is provided at one end of the car adjacent a railroad wheel truck 6. Other doors are provided on the car, each including an associated stairwell. Door 4b is positioned opposite the door 4a, while two more doors (not shown), one opposite another, are provided at the other end of the car. Typically, the bottom edges of the doors are positioned well above the bottommost portions of the associated stairwells, at about the level of the floor 12 of the railway car 3.

Preferably, a lift 2 is installed in each of the stairwells at one end of car 3. Typically, the region 7 adjacent one of the doors equipped with lift 2 is modified to receive and support a wheelchair. By installing a lift 2 in each of the stairwells on opposite sides of one end of the railway car 3, a wheelchair occupant may be loaded from either side of the car and only one region 7 need be provided per car. Normally abled passengers seated adjacent region 7 may enter and exit car 3 from either the opposite end of the car or by passing through the vestibule into the next car and using its steps. Alternatively, lift 2 could be installed along the length of the car at any place where there is room beneath the car to accommodate the lift in a stowed position, as will be described.

Figure 3:
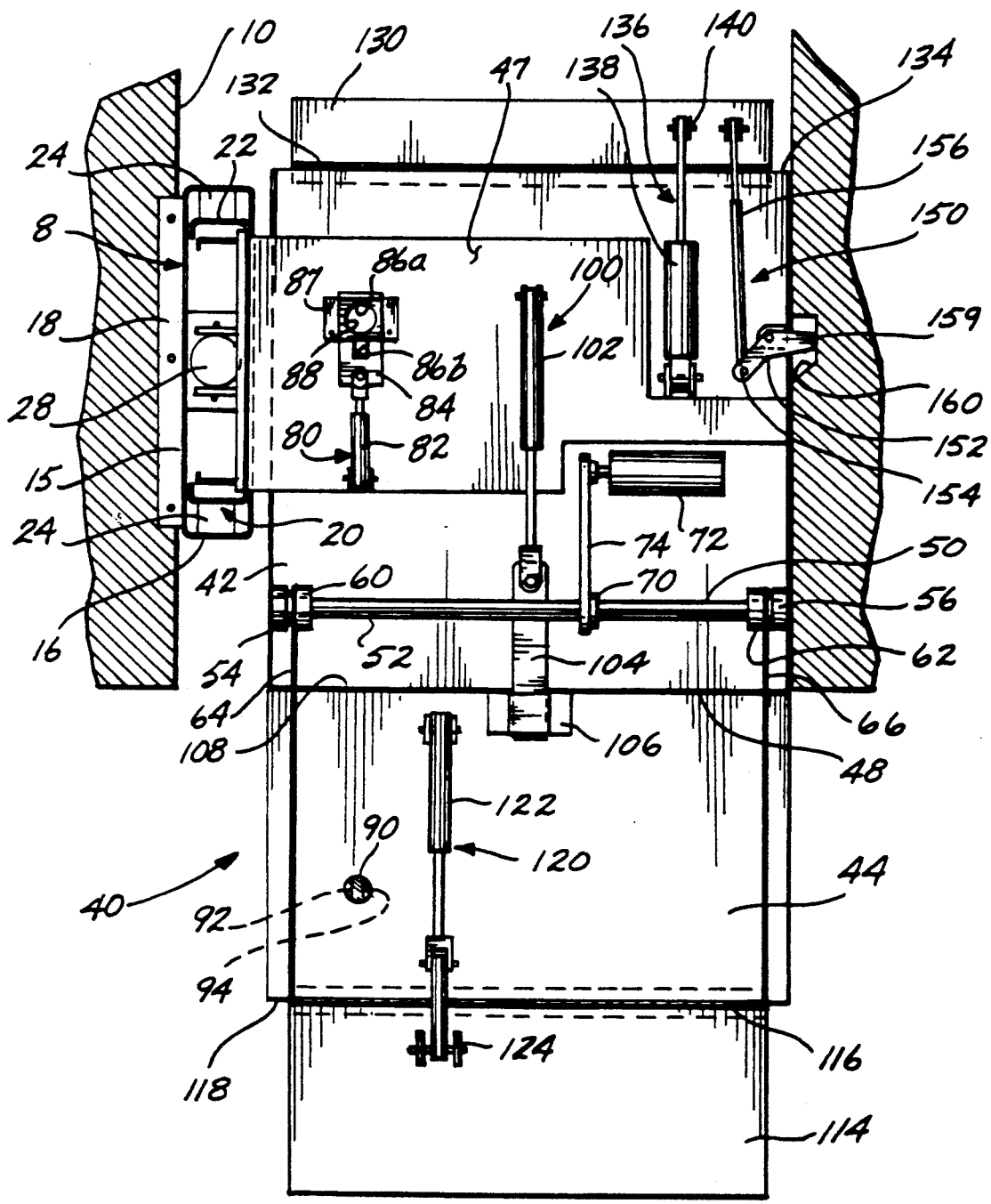
FIG. 3 is a cross section view of the lift taken along a plane extending parallel to and beneath the platform assembly and intersecting the vertical translation mechanism, the view being taken looking up at the bottom surface of the platform assembly, with the bridge and outer barriers being shown in the extended or open position.

Referring now to FIGS. 1, 3 and 5, lift 2 comprises an elongate tower or fixed frame 8 to be attached at an angle to the wall 10 (FIGS. 1 and 3) on one side, e.g., the right side as seen in FIG. 1, of the stairwell 5 of railway passenger car 3. The tower extends from a point about four feet above the car floor 12 to a point about two feet below the car floor so as to terminate somewhat above the bottommost portion 14 (FIG. 5) of stairwell 5. Tower 8 is inclined along its long axis relative to the vertical so that the bottom end of the tower is positioned outboard of the top end of the tower and outboard of the wheels of car 3.

Turning to FIGS. 3, 5 and 6, tower 8 consists of a U-shaped channel having a back wall 15 and a pair of opposing vertical guide ways 16 attached to opposite sides of the back wall extending perpendicular thereto away from wall 10 to which the tower is attached. Thus, by this attachment, back wall 15 extends parallel to wall 10. To attach the tower 8 to the stairwell wall 10, a pair of brackets 18 (FIG. 6) may be provided and attached to the tower by welding or other suitable means and then bolted to the stairwell wall.

Lift 2 includes a vertical translation mechanism 19 (FIG. 6) comprising a frame 20 which is vertically slidably mounted in the tower 8. Frame 20 has a generally U-shaped cross-sectional configuration, and comprises a front wall 21 and sidewalls 22 attached to opposite sides of the front wall so as to extend perpendicular to the front wall. Frame 20 is positioned relative to tower 8 so that sidewalls 22 extend into the space between the guide ways 16 so as to confront and extend parallel to the guide ways. Frame 20 includes guide blocks 24 which are attached to the outer surfaces of sidewalls 22. Guide blocks 24 are made from a rigid material having a low coefficient of friction, such as nylon, and are sized and positioned to bear against the inner surface of the guide ways 16 to provide support for frame 20 and to facilitate free movement of the frame up and down the guide ways.

Vertical translation mechanism 19 of lift 2 further comprises a piston rod 26, and a hydraulic cylinder 28 for receiving and actuating the piston. The upper end of cylinder 28 is secured by any suitable means at an angle to a cross piece 30 extending across the top of the tower 8 so that the travel of the piston rod 26 is parallel to the angle of incline of the tower, i.e., is parallel to guideways 16. The lower end of piston rod 26 is attached to bracket 31 (FIGS. 5 and 6) which is attached to the lower end of frame 20 and is sized to extend across the entire width of the frame. By operation of the piston rod 26 in the cylinder 28, the movable frame 20 may be raised and lowered between an upper position where the lower end of frame 20 is substantially level with the car floor 12 and a lower position where the lower end of frame 20 contacts or is positioned near the ground adjacent the railroad bed.

Lift 2 comprises a platform assembly 40 including a main platform 42 and a pivot platform 44. Main platform 42 has a planar, rectangular configuration, with the width of the main platform (i.e., the distance between the right and left edges of the main platform as seen in FIG. 3) being somewhat greater than the distance between the wheels of a conventional wheelchair. Main platform 42 is attached to bracket 31 by rigid plate 47 (FIGS. 3, 5 and 6) which is sized to extend across substantially the entire width and a significant portion of the length of the main platform. Plate 47 is attached to the bottom surface of main platform 42 by welding or other conventional means, thereby coupling the main platform with bracket 31, and hence with frame 20 and piston 26.

Pivot platform 44 also has a planar, rectangular configuration, with the width of the pivot platform (i.e., the distance between the left and right edges of the pivot platform, as seen in FIG. 3) being substantially equal to the width of main platform 42. Pivot platform 44 is pivotally mounted to the outboard end 48 (FIG. 3) of main platform 42 by pivot mechanism 50.

Pivot mechanism 50 comprises a drive shaft 52 and bearing boxes 54 and 56. The latter are attached to the bottom surface of main platform 42, near (about 6 inches away from) the outboard edge 48 of the main platform so that the axis of the drive shaft extends parallel to the outboard edge. Bearing boxes 54 and 56 rotatably support drive shaft 52. Drive shaft 52 is attached via connectors 60 and 62 to extension members 64 and 66 of pivot platform 42 so that the latter will rotate with the drive shaft.

Referring to FIGS. 3, 4 and 8, pivot mechanism 50 additionally comprises a sprocket 70 attached to drive shaft 52, an electric drive motor 72 attached to the bottom surface of main platform 42, and a flexible drive member 74, such as a chain or drive belt, for transmitting rotational drive from motor 72 to sprocket 70, and hence to drive shaft 52 and pivot platform 44. By appropriate operation of motor 72, pivot platform 44 may be caused to move between an extended position, as illustrated in FIG. 8, where the pivot platform is substantially coplanar with main platform 42, and a stowed position, as illustrated in FIG. 4, where the pivot platform is positioned beneath the main platform and extends substantially parallel thereto.

Figure 7:
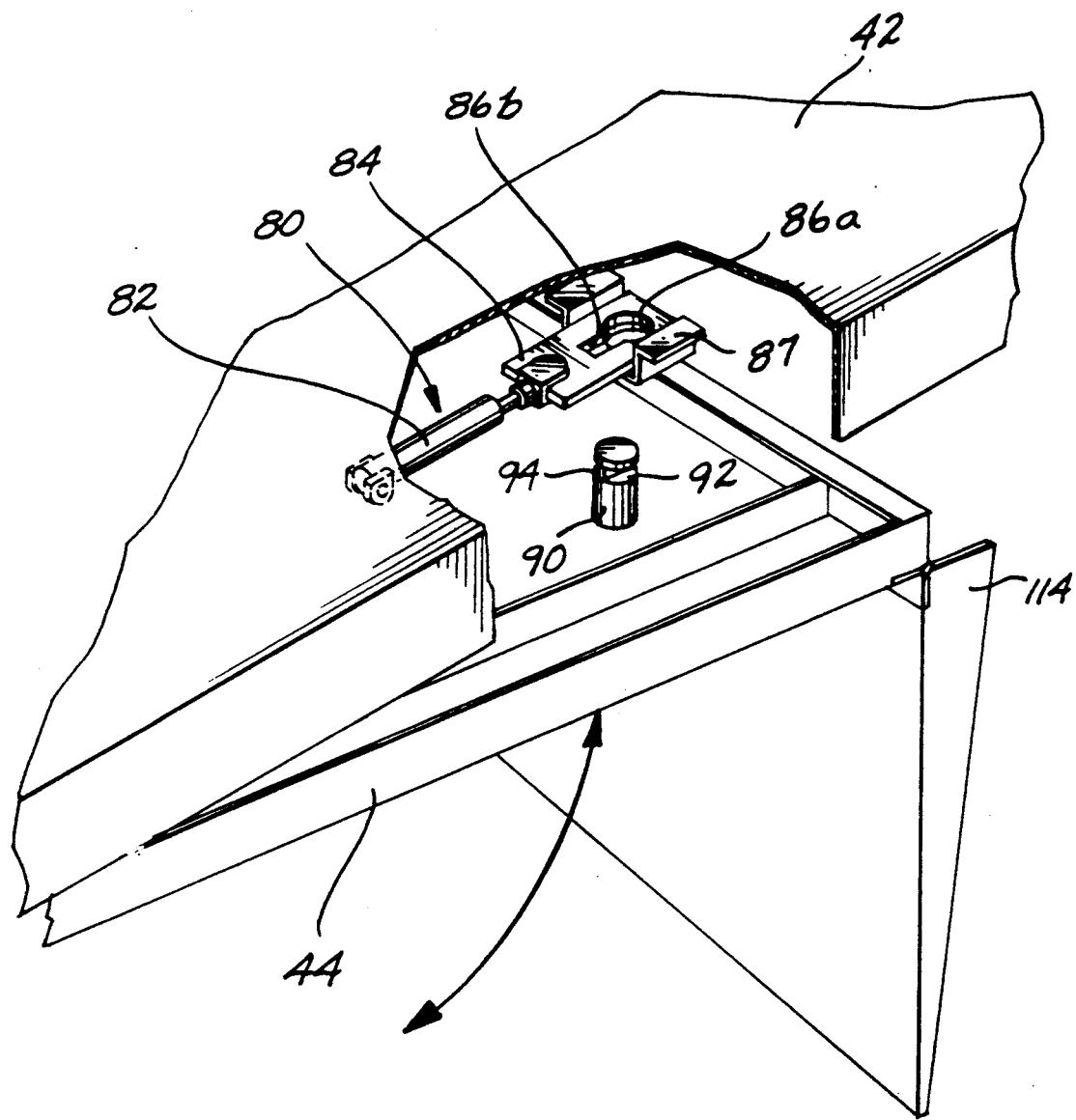
FIG. 7 is a side elevation view of the platform assembly in the stowed position.

Turning now to FIGS. 3 and 7, platform assembly 40 further comprises stow mechanism 80 (FIG. 3) for securing pivot platform 44 in the retracted or stowed position, i.e., in substantially parallel relation with main platform 42, underneath the main platform. Stow mechanism 80 comprises a linear actuator 82, one end of which is secured to the bottom surface of main platform 42, and the other end of which is attached to flat plate 84. As discussed in greater detail hereinafter, linear actuator 82 is designed to cause plate 84 to move toward and away from outboard edge 48 of the main platform parallel to the plane of the latter. Plate 84 comprises a keyway slot 86 extending therethrough having an enlarged, circular portion 86a and a narrow, elongate portion 86b communicating with the circular portion. Plate 84 is slidably supported in a housing 87 so as to permit linear actuator 82 to reciprocatably translate the plate, as ; iscussed above.

Housing 87 is attached to the bottom surface of main platform 42 and includes a bore 88 therein having a diameter which is substantially identical to the diameter of circular keyway portion 86a. Bore 88 extends perpendicular to the bottom surface of main platform 42 and is positioned in housing 87 so as to be aligned with circular keyway portion 86a when plate 84 is in the retracted position illustrated in FIG. 3.

Referring to FIGS. 3, 4 and 7, stow mechanism 80 also comprises a pin 90 attached to the bottom surface of pivot platform 44. Pin 90 is positioned so that when pivot platform 44 has been moved to the stowed position illustrated in FIGS. 4 and 7, the pin will be received in bore 88 of housing 87 and circular keyway portion 86a, assuming plate 84 is in the retracted position. Pin 90 has a circular cross section and a diameter just slightly less than the diameter of bore 88 and circular keyway portion 86a.

Pin 90 includes diametrically opposed grooves 92 and 94 (FIG. 3) positioned near the end of the pin and extending perpendicular to the longitudinal axis of the pin. Grooves 92 and 94 each include a planar inner wall (not shown) which extends parallel to the axis of pin 90. The inner walls of grooves 92 and 94 are parallel and are spaced from one another a distance slightly less than the width of keyway portion 86b in plate 84. Each groove 92 and 94 further includes parallel, planar upper and lower walls (not shown) which extend perpendicular to the respective inner walls. The upper walls of grooves 92 and 94 are coplanar, as are the lower walls, with the spacing between the upper and lower walls being slightly greater than the thickness of plate 84. As discussed in greater detail below, by this sizing and placement of the inner, upper, and lower walls of grooves 92 and 94, plate 84 may be releasably engaged with pin 90 so as to prevent the plate from moving along the axis of pin 90.

Platform assembly 40 further comprises a latch mechanism 100 (FIG. 3) for securing pivot platform 44 in the extended position, i.e., for securing pivot platform 44 in substantially coplanar relation with main platform 42. Latch mechanism 100 includes a linear actuator 102, one end of which is attached to the bottom surface of main platform 42 and the other end of which is attached to knife plate 104. The latter is an elongate, flat plate. Knife plate 104 is sized to be received in pocket 106 positioned adjacent inboard edge 108 of pivot plate 44 when the knife plate has been moved by linear actuator 102 to the extended position as illustrated in FIG. 3. Pocket 106 is sized to receive knife plate 104 with a close sliding fit. Knife plate 104 is further sized so that no portion thereof will project beyond outboard edge 48 of main platform 42 so as to overlap pivot platform 44 when linear actuator 102 has moved the knife plate to the retracted position (not shown).

Referring to FIGS. 3, 8 and 9, to prevent wheelchair users from rolling off platform assembly 40 while the latter is being raised and lowered, the platform assembly includes an outer barrier 114 which is pivotally mounted by hinge 116 (FIG. 8) to the outboard end 118 of pivot platform 44. Outer barrier 114 has a planar, rectangular configuration. An actuation device 120 (FIG. 3) is provided for causing the outer barrier to move between the retracted or barrier position, as illustrated in FIG. 8, and the extended position, as illustrated in FIGS. 3 and 9. Actuation device 120 includes a linear actuator 122, one end of which is attached to the bottom surface of pivot platform 44, and the other end of which is attached via bracket 124 to the bottom surface of outer barrier 114.

Referring to FIGS. 3, 4, and 8, platform assembly 40 additionally comprises bridge barrier 130 for preventing wheelchairs users from rolling off the inboard end of the main platform 42 during raising and lowering operations. Bridge barrier 130 has a planar, rectangular configuration, and is pivotally mounted by hinge 132 (FIG. 3) to inboard end 134 of main platform 42. An actuation device 136 is provided for causing bridge barrier 130 to move between the extended position illustrated in FIG. 4, where the bridge barrier extends substantially parallel with main platform 42, and the retracted or barrier position illustrated in FIG. 8, where the bridge barrier extends perpendicular to main platform 42. Actuation device 136 includes a linear actuator 138, one end of which is attached to the bottom surface of main platform 42 and the other end of which is attached via bracket 140 to the bottom surface bridge barrier 130.

Linear actuators 82, 102, 122, 138, and cylinder 28 may be either pneumatic or hydraulic actuators. A conventional fluid supply and control system of the type well known in the art is used to control the operation of the linear actuators of platform 40 and cylinder 28.

Additionally, electric motor 72 of platform assembly 40 is controlled by a conventional electrical control system of the type well known in the art. As those of ordinary skill will readily appreciate, such control systems are operated so as to cause the various movable components of lift 2 to operate in the manner described below in connection with the description of the operation of lift 2.

To ensure platform assembly 40 does not inadvertently move up or down when in the fully raised position, i.e., when main platform 42 is coplanar with floor 12 of railway car 3, a latch mechanism 150 (FIG. 3) is provided. Latch mechanism 150 includes a latch 152 which is pivotally mounted at pivot point 154 to the bottom surface of main platform 42 adjacent the edge thereof opposite the edge of the main platform attached to vertically movable frame 20. Latch mechanism 150 includes a linkage member 156, one end of which is pivotally attached at 158 to latch 152 and the other end of which is pivotally attached to the bottom surface of bridge barrier 130. Latch 152 is configured and is pivotally mounted to main platform 42 so that when actuation device 136 causes bridge barrier 130 to move to the extended position illustrated in FIGS. 3 and 4, linkage member 156 will cause latch 152 to pivot into the locked position illustrated in FIG. 3. In the locked position, a projecting finger portion 159 of latch mechanism 152 is received in a pocket 160 provided in the side wall of stairwell 5. Pocket 160 is sized so as to permit the projecting portion 159 of latch 152 to be moved into and out of the pocket, and to substantially prevent the projecting portion of the latch mechanism from moving up and down within the pocket when in the locked position illustrated in FIG. 3. When actuation device 136 causes bridge barrier to move to the retracted position illustrated in FIG. 7, linkage member 156 is caused to move so as to cause latch 152 to pivot about pivot point 154 sufficiently to disengage projecting portion 159 of latch 152 from pocket 160.

Referring to FIG. 9, for the protection and safety of users of lift 2, platform assembly 40 further comprises handrails 166 attached to the outer edges of pivot platform 44 so as to extend upwardly away from, and perpendicular to, the upper surface of the pivot platform. Fixed side barriers 168 are attached to the side edges of main platform 42 so as to extend upwardly from, and perpendicular to, the upper surface of the main platform. Fixed side barriers 168 prevent a wheelchair user from sliding off the sides of main platform 42, and in the case of the barrier adjacent frame 20, to cover moving piston rod 26.

Figure 10:
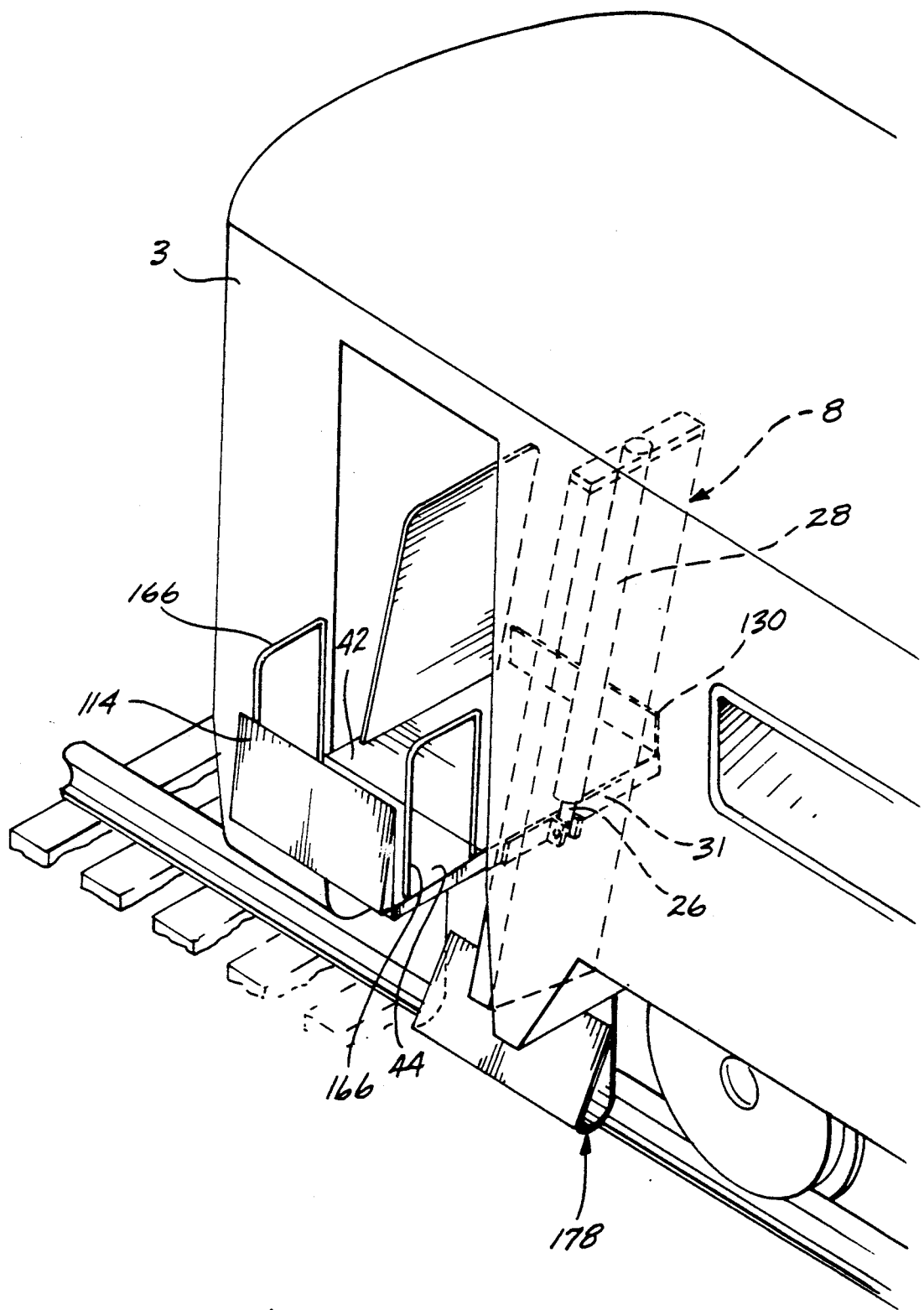
FIG. 10 is similar to FIG. 9, except that the platform assembly is shown in the upper position, with the barriers being erected so that the platform assembly is ready to be raised and lowered.

Referring to FIGS. 4, 8 and 10, lift 2 comprises a protective cover 178 for closing off the portion of stairwell 5 beneath the bottom edge of door 4 when lift 2 is in the stowed position. Protective cover 178 includes a bottom plate 180, the inboard end of which is pivotally mounted at 182 to stairwell 5 so as to be movable between the closed position illustrated in FIG. 4 and the open position illustrated in FIG. 8. Cover plate 178 additionally comprises upper plate 184 which is pivotally mounted to the outboard end of plate 180 at pivot point 186. This pivotal mounting of plate 184 to plate 180 permits the former to move between the closed position, as illustrated in FIG. 4, where plate 184 extends nearly perpendicular to the majority of plate 180, and the open position, as illustrated in FIG. 8, where plate 184 extends nearly parallel to the majority of plate 180. Protective cover 178 may be designed for manual operation, or a conventional linear actuator (not shown) may be coupled with the protective cover so as to cause it to move between the open and closed positions.

In connection with the following description of the operation of lift 2, reference should be made to FIGS. 1-10, and it should be assumed that lift 2 is initially in the stowed position illustrated in FIG. 4. In this stowed position, main platform 42 is substantially coplanar with floor 12 of railway car 3. Additionally, bridge barrier 130 is in the extended position, i.e., it is substantially coplanar with the upper surface of main platform 42 and it spans any gap which may exist between the inboard edge 134 of main platform 42 and floor 12 of railway car 3. Additionally, in the stowed position pin 90 (attached to the bottom surface of pivot platform 44) is positioned in bore 88 in housing 87 (attached to the bottom surface of main platform 42), and linear actuator 82 has been operated so as to move plate 84 to the extended position, as illustrated in FIG. 7. In the extended position, pin 90 is captivated within narrow keyway portion 86b of plate 84 so that the pin cannot move up or down along its axis. By this captivation, pivot platform 44 is prevented from pivoting relative to main platform 42. Additionally, in the stowed position, protective cover 178 is in the closed position illustrated in FIG. 4, and door 4 is assumed to be closed. Also, outer barrier 114 is in the closed position, i.e., it extends perpendicular to the top surface of pivot platform 44.

To use lift 2, protective cover 178 is opened so as to cause its plates 180 and 184 to extend downwardly below stairwell 5, as illustrated in FIG. 8. After opening door 4 of railway car 3, linear actuator 82 is operated to retract plate 84 so that pin 90 is received in the circular keyway portion 86a of plate 84. Then, motor 72 is actuated so as to cause drive shaft 52 to rotate in a counter clockwise direction, as viewed in FIG. 8. This rotational drive is transmitted from drive shaft 52 to extension members 64 and 66 of pivot platform 44 so as to cause the pivot platform to move from the stowed position illustrated in FIG. 4 to the deployed position illustrated in FIG. 8. Next, actuator 102 is operated so as to cause knife plate 104 to move into pocket 106 attached to the bottom surface of pivot platform 44, thereby locking pivot platform in coplanar relation with main platform 42.

Next, after a wheelchair occupant has moved onto main platform 42 and pivot platform 44, linear actuator 138 is operated so as to cause bridge barrier 130 to move to the closed position illustrated in FIG. 8, thereby preventing the wheelchair from rolling off the inboard end of main platform 42. As bridge barrier 130 is moved from the extended to the retracted position, it causes linkage member 156 to move toward inboard end 134 of main platform 42 so as to cause latch 152 to pivot from the locked to the unlocked position. As noted above in the unlocked position, no portion of latch 152 is received in pocket 160, with the result that platform assembly 40 is free to move up and down along the length of tower 8.

Hydraulic cylinder 28 is then operated so as to cause its piston 26 to move downwardly. This downward movement is transmitted via bracket 31 and plate 47 to main platform 42 so as to cause the main platform, and pivot platform 44, and bridge barrier 130 attached thereto, to move downwardly. Downward and upward movement of platform assembly 40 occurs along an inclined axis extending parallel with tower 8. This angular relationship is maintained by the sliding engagement of frame 20 within tower 8. The bottom end of tower 8 is inclined outwardly with respect to the upper end of the frame so that main platform 42 will be positioned outboard of the wheels of railway car 3 and the track on which the wheels roll when platform assembly 40 is moved to the lower position illustrated in FIG. 9. Thus, platform assembly 40 is located further away from the medial plane 200 (FIG. 1) of the railway car 3, as measured along an axis extending parallel to floor 12 of car 3 and perpendicular to the medial plane, when the platform assembly is in the lower position than when the platform assembly is in the upper position. Once platform assembly 40 reaches the lowered position illustrated in FIG. 9, actuator 122 is operated so as to cause outer barrier 114 to move from the retracted position illustrated in FIG. 8 to the extended position illustrated in FIG. 9. Then, the wheelchair may be rolled off the platform assembly 40 and onto the surface on which the latter rests.

In some cases where the wheelchair user will exit the railway car 3 onto an adjacent platform positioned at substantially the same level as the floor 12 of railway car 3, it will unnecessary to raise or lower platform assembly 40 for the wheelchair occupant to exit the railway car. In this latter case, outer barrier 114 is lowered to provide a continuous surface between the floor 12 of the railway car and the adjacent platform.

The operations discussed above are performed in reverse when it is desired to lift a wheelchair occupant from the ground, or from an adjacent platform, into railway car 3.

An important advantage of the wheelchair lift of the present invention is that the lift is designed to be attached to only one wall of the stairwell of a railway car. This feature is partially desirable when the lift is to be installed in railway cars of the type having structure sufficient for supporting the lift located on only one side of the stairwell, as is frequently the case.

Another important advantage of the wheelchair lift of the present invention is that it provides a surface of sufficient size for supporting a wheelchair and its occupant, while at the same time being designed for stowing within the relatively narrow confines of a railway car stairwell.

Since certain changes may be made in the above apparatus without departing from the scope of the invention herein involved, it is intended that all matter contained in the above description and shown in the accompanying drawings shall be interpreted in an illustrative and not in a limiting sense.

I claim:

1. A wheelchair lift for railway passenger cars having a door opening, a car floor and a well extending below the door opening and the car floor, the lift comprising:

an elongate guide frame to be secured to the passenger car on at least one side of the door opening so as to be positioned above, and extend downwardly into, the well, said guide frame having opposing first and second guideways that define opposite edges of a hollow, elongate region disposed between said guideways;

a movable frame positioned in said elongate region and sized and configured for slidable movement along said guideways of said guide frame between an upper position, where substantially said entire movable frame is received in said guide frame, and a lower position, where said movable frame projects below said guide frame and confronts a surface adjacent the passenger car;

a linear actuator having one end connected to said movable frame and an opposite end connected to said guide frame, said linear actuator being positioned in said elongate region for moving said movable frame along said guide frame;

a main platform, having a planar surface;

a bracket assembly for rigidly connecting said main platform to said movable frame so that said planar surface of said main platform extends substantially parallel to the floor of the railway passenger car, when said guide frame is secured to the car so as to extend at a predetermined nonorthogonal angle relative to the car floor, regardless of the position of said movable frame relative to said guide frame; and a pivot platform connected to said main platform and pivotally movable between a first position below said main platform and a second position substantially coextensive with said main platform.

2. A wheelchair lift as set forth in claim 1, including means for causing said pivot platform to move between said first and second positions.

3. A wheelchair lift as set forth in claim 1, including a cover for covering the well, said cover being designed for pivotal attachment to the railway car below the well so as to be pivotally movable from a position covering the well to a position exposing the well, said cover including a first portion for covering a bottom portion of the well and a second portion for covering a side portion of the well.

4. A wheelchair lift as set forth in claim 1, including an outer barrier pivotally attached to said pivot platform so as to be movable between a first position where said outer barrier extends perpendicular to said pivot platform and a second position where said outer barrier is substantially coplanar with said pivot platform.

5. A wheelchair lift for use with a vehicle having a floor, a door opening, a medial plane extending perpendicular to the floor along the length of the vehicle, and a well positioned below the vehicle floor in communication with the door opening, the lift comprising;

first means for providing (a) a first surface for supporting a wheelchair and (b) a second surface opposite said first surface;

second means for providing (a) a third surface for supporting a wheelchair and (b) a fourth surface opposite said third surface, said second means being attached to said first means so that said second means may be moved between (a) a deployed position where said third surface is substantially coplanar with said first surface and (b) a stowed position where said second surface is positioned in confronting, substantially parallel relation to said fourth surface;

third means, attachable to the vehicle adjacent the door opening thereof, (a) for supporting said first means so that said first surface extends substantially parallel to the floor of the vehicle and (b) for causing said first means to move between (i) a first posiiton, where said first surface is coplanar with the vehicle floor and said first surface is positioned at an inboard position, and (ii) a second position where said first surface is positioned a predetermined distance below the vehicle floor at an outboard position, said outboard position being spaced a greater distance from the medial plane of the vehicle than said inboard position, as measured along an axis extending parallel to the floor and perpendicular to the medial plane;

first latch means for locking said first means in said first position; and second latch means for locking said second means in said stowed position, wherein said second latch means includes (a) a pin attached to said fourth surface of said second means, said pin having at least one groove in side thereof and (b) a bracket assembly designed and attached to said second surface of said first means so as to receive said pin when said second means is in said stowed position, said bracket assembly including a plate and slide means for supporting said plate relative to said second surface such that said plate is permitted to move relative to said second surface between locked and unlocked positions, said plate and said slide means being designed so that when said plate is in said locked position and said second means is in said stowed position, said plate is positioned in said at least one groove so as to prevent said pin from moving relative to said bracket assembly.

6. A wheelchair lift according to claim 5, further comprising (a) a barrier plate for preventing a wheelchair positioned on said first and third surfaces, when said second means is in the deployed position, from rolling off said first and third surfaces, said barrier plate being pivotally mounted to said second means so as to be movable between a barrier position and a ramp position, and (b) an actuation assembly, including a linear actuator and a linkage member, the latter being attached between said first latch means and said barrier plate, for causing said barrier plate (i) to move between said barrier and ramp positions and (ii) for operating said first latch means.

7. A wheelchair lift according to claim 5, wherein said third means comprises an elongate tower which is attachable to the vehicle, a frame mounted for slidable movement along the length of the tower, connection means for connecting said first means to said frame and drive means connected to said frame for causing said frame to reciprocate linearly along the length of said tower.

* * * * *

UNITED STATES PATENT AND TRADEMARK OFFICE
CERTIFICATE OF CORRECTION

PATENT NO. : 5,165,839
DATED : November 24, 1992
INVENTOR(S) : L.S. Aoki

It is certified that error appears in the above-identified patent and that said Letters Patent is hereby corrected as shown below:

| COLUMN | LINE | |
|---|---|---|
| 5 | 49 | "wheelchairs" should read --wheelchair-- |
| 10 | 6 | "posiiton" should read --position-- |
| 10 | 22 | after "in" insert --a-- |

Signed and Sealed this

Seventh Day of December, 1993

Attest:

BRUCE LEHMAN

Attesting Officer    Commissioner of Patents and Trademarks